United States Patent [19]

Kugimiya et al.

[11] Patent Number: 4,931,936
[45] Date of Patent: Jun. 5, 1990

[54] LANGUAGE TRANSLATION SYSTEM WITH MEANS TO DISTINGUISH BETWEEN PHRASES AND SENTENCE AND NUMBER DISCRMINATING MEANS

[75] Inventors: Shuzo Kugimiya; Yoji Fukumochi; Ichiko Nakamura, all of Nara; Tokuyuki Hirai, Yamatokoriyama; Hitoshi Suzuki, Nara, all of Japan

[73] Assignee: Sharp Kabushiki Kaisha, Osaka, Japan

[21] Appl. No.: 262,314

[22] Filed: Oct. 25, 1988

[30] Foreign Application Priority Data

Oct. 26, 1987 [JP] Japan .................. 62-271286
Dec. 23, 1987 [JP] Japan .................. 62-326391

[51] Int. Cl.$^5$ .................................. C06F 15/38
[52] U.S. Cl. .................... 364/419; 364/200; 364/900
[58] Field of Search ............ 364/419, 200, 900

[56] References Cited

U.S. PATENT DOCUMENTS 4,481,607 11/1984 Kobayashi et al. ............ 364/900
4,829,423 5/1989 Tennant et al. ............... 364/900

Primary Examiner—Jerry Smith
Assistant Examiner—Gail O. Hayes
Attorney, Agent, or Firm—Birch, Stewart, Kolasch & Birch

[57] ABSTRACT

A machine translation apparatus is disclosed which includes a number discriminator which distinguishes whether or not the first morpheme to appear in the sentence separated by a morpheme analyzer is a number, and a memory control which, when the number discriminator identifies the morpheme at the beginning to be a number, stores data which identifies the number as a sentence beginning adverb so that the number is added to the beginning of the translated sentence converted to the target language, thus enabling the distinguishable translation between the ordinary sentence and the itemized sentence which begin with a number. The machine translation apparatus further includes a heading specifying step which specifies the words stored in a buffer to be a heading if a word continuing after the word stored in the buffer is a last word and is other than a period, a question mark and an exclamation mark, thus enabling the distinguishable translation between the ordinary sentence and the heading.

4 Claims, 9 Drawing Sheets

Fig. 13

| Parts of speech<br>Word Position | 1 | 2 | 3 |
|---|---|---|---|
| surface  1 | noun | verb | adj. |
| temperatures  2 | noun | | |
| rise  3 | verb | noun | |
| 4 | end | | |

Fig. 16

| | <INPUT> | <OUTPUT> |
|---|---|---|
| (a) | Surface Temperatures Rise | 表面温度上昇 |
| (b) | Surface temperatures rise. | 表面温度は、上昇する。 |

LANGUAGE TRANSLATION SYSTEM WITH MEANS TO DISTINGUISH BETWEEN PHRASES AND SENTENCE AND NUMBER DISCRMINATING MEANS

BACKGROUND OF THE INVENTION

1. Field of the Invention

The present invention relates to a machine translation apparatus which can distinguish whether the input word string is a normal sentence or a special words string, such as a heading or an itemized sentence which begin with a number, and appropriately translate the word string according to its style.

2. Description of the Prior Art

A machine translation apparatus as is known from the prior art is described as follows. Such a machine translation apparatus inputs the source language text entered from a keyboard into a translation module as controlled by the main CPU, and the input source text is translated into the target language using dictionaries, grammatical rules, and tree structure conversion rules stored in the memory of the translation module.

When a special sentence, such as an itemized sentence which begins with a number is to be translated, manual removal of the lead number is required before translation by the translation machine or otherwise, the translation will fail.

When a translation is attempted using a machine translation apparatus according to the prior art as hereinbefore described, translation of itemized sentences which begin with a number will fail because the conventional machine translation apparatus is not able to determine whether the numeric expressing the aforementioned number is a cardinal number or ordinal number. For example, when the original English itemized sentence:

2. This is a book.

is to be translated into Japanese, the translation analysis should begin not from the first occurring letter "2", but from the second occurring "This". It is therefore necessary for the operator to manually delete the numeric, thus increasing the burden on the operator.

Also, when a translation is attempted using a machine translation apparatus according to the prior art as heretofore described, because the structure of the original input sentence (for example, English sentence) is decided according to grammatical rules stored in memory, and it is not possible to distinguish whether the original being processed is a sentence or a heading (which are, in general, noun phrases), the grammatical rules for common sentences stored in the aforementioned memory are applied irrespective of whether the input original is a heading, and misinterpretation of the original often occurs. For example, when the original English word string of a heading:

Surface Temperatures Rise is to be translated into Japanese, the translation analysis should properly decide whether the word "Rise" is a verb or a noun, because in Japanese, the verb form and the noun form of the word "Rise" are different. Furthermore, there has also been the problem that since the beginning of each word in a word string forming a heading is normally a majuscule, certain words in the heading may not match the registered words in the dictionary when the dictionary is referenced; as a result, said words may be handled as proper nouns or determined to be unlearned words, thereby making part of speech determination for said words difficult, and making it easier for misinterpretations to occur.

SUMMARY OF THE INVENTION

The present invention has been developed with a view to substantially solving the above described disadvantages and has for its essential object to provide an improved machine translation apparatus which can distinguish whether the first morpheme appearing in the sentence is a number, and which thereby enables itemized sentences which begin with a number to be translated correctly and quickly.

It is also an essential object of the present invention to provide an improved machine translation apparatus which can distinguish whether the original is a sentence or a heading, an which enables a more appropriate interpretation of the original based on the result of this distinction.

In order to achieve the first mentioned object, according to a preferred embodiment of the present invention, a machine translation apparatus comprises a morpheme analyzer which uses a dictionary to separate the input sentence into morphemes and obtain part of speech and other information, a sentence structure analyzer which analyzes the grammatical construction of the morpheme strings separated by the aforementioned morpheme analyzer using a dictionary and grammatical rules, a convertor which converts the structure of the grammatical construction obtained with the aforementioned sentence structure analyzer into a grammatical construction, of the target language, and a translated sentence generator which generates a translated sentence according to the structure of the grammatical construction of the target language obtained with the aforementioned convertor; specifically, a machine translation apparatus provided with a number discrimination means which distinguishes whether or not the first morpheme to appear in the sentence separated by the aforementioned morpheme analyzer is a number, and a memory control means which, when the aforementioned number discrimination means identifies the morpheme at the beginning to be a number, stores data which identifies said number as a sentence beginning adverb so that said number is added to the beginning of the aforementioned translated sentence converted to the target language.

In operation, the input sentence is separated into morpheme strings by a morpheme analyzer, and a number discrimination means determines whether the first separated morpheme to appear in the sentence is a number. If the result is that the first morpheme is a number, data identifying said number as a sentence beginning adverb is stored by the memory control means, and dictionary referencing for part of speech analysis of this number does not occur. If, however, it is determined that the first morpheme to appear in the sentence is not a number, dictionary referencing for part of speech analysis does occur.

The input sentence is thus separated into morphemes, the structure of the sentence is determined by the syntax analyzer based on part of speech information obtained by dictionary referencing and on information identifying the stored morpheme as a sentence beginning adverb, the syntax of the source language is converted to a syntactical construction in the target language by the converter, and a translated sentence is generated by the translated sentence generator according to the syntax of the aforementioned target language.

Thus, because dictionary referencing is not executed for numbers at the sentence beginning, there is not problem with, for example, determining whether the numeric is cardinal or ordinal number, and it is therefore possible to correctly and quickly translate itemized sentences which begin with a number.

In order to achieve the second mentioned object, according to a preferred embodiment of the present invention, a machine translation apparatus comprises a morpheme analyzer which uses a dictionary to separate the input sentence into morphemes and obtain part of speech and other information, a syntax analyzer which analyzes the structure of the morpheme strings separated by the aforementioned morpheme analyzer using a dictionary and grammatical rules, a convertor which converts the structure obtained with the aforementioned syntax analyzer to the structure of the target language, and a translated sentence generator which generates a translated sentence according to the structure of the target language obtained with the aforementioned convertor; specifically, a machine translation apparatus provided with a majuscule discrimination means which distinguishes whether or not the first letter of the input morpheme is a majuscule, a storage means which stores morphemes for which the first letter was distinguished to be a majuscule by the aforementioned majuscule discrimination means, a heading specifying means which specifies the morpheme stored in said storage means to be a heading if a morpheme continuing after the morpheme stored in said storage means is a terminal morpheme and is neither a period nor a question mark, and a majuscule/minuscule conversion means which converts the lead majuscule of the morpheme stored in said storage means to a minuscule if the aforementioned heading specifying means specifies that the morpheme stored in said storage means is a heading, and which therefore has the ability to produce an appropriate translation of the heading.

In operation, the input sentence is separated into morphemes by a morpheme analyzer, and a majuscule discrimination means distinguishes whether or not the beginning of this morpheme is a majuscule. As the result of this operation, all morphemes which are distinguished to begin with a majuscule are stored in the storage means. Then, if the morpheme following the morpheme stored in the aforementioned storage means is a terminal morpheme, and is neither a period nor a question mark, the morpheme stored in said storage means is specified to be a heading by the heading specifying means. The majuscule at the beginning of the morpheme stored in said storage means is thus converted to a minuscule by the majuscule/minuscule conversion means. The part of speech information for said morpheme converted to a minuscule is then obtained using a dictionary.

Therefore, it is determined whether the input sentence is a heading or not, and if it is a heading a translation appropriate to a heading is possible.

BRIEF DESCRIPTION OF THE DRAWINGS

These and other objects and features of the present invention will become apparent from the following description take in conjunction with preferred embodiments thereof with reference to the accompanying drawings, throughout which like parts are designated by like reference numerals, and in which:

FIG. 13 is a diagrammatic view of a dictionary referencing result buffer showing the stored contents;

FIG. 16 is a diagram showing a sample of the display showing the result of the translation.

DETAILED DESCRIPTION OF THE PREFERRED EMBODIMENTS

Figure 1:
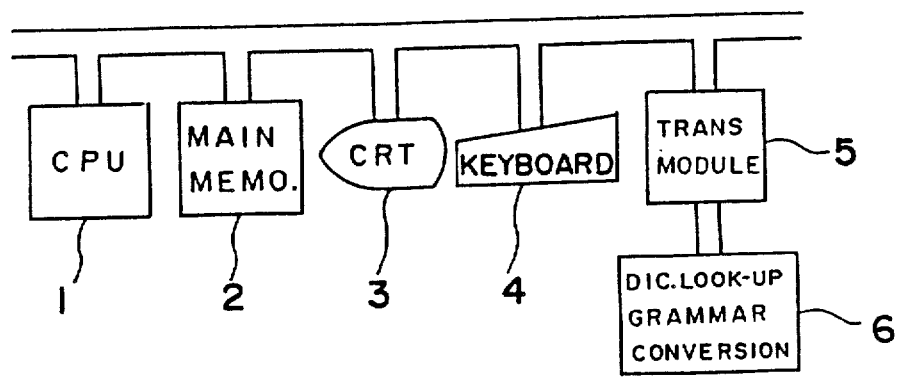
FIG. 1 is a block diagram of a preferred embodiment of a machine translation apparatus according to the present invention.

Referring to FIG. 1 a block diagram of a machine translation apparatus according to the present invention is shown. Reference numeral 1 is a main CPU (central processing unit), 2 is a main memory, 3 is a CRT 3 (cathode ray tube), 4 is a keyboard, 5 is a translation module, and 6 is a memory device storing dictionaries, grammatical rules, and tree structure conversion rules for translation.

When the source language text is input to the aforementioned translation module 5, translation module 5 translates this, and outputs the target language. Specifically, the source language entered from keyboard 4 is sent to translation module 5 as controlled by main CPU 1. Translation module 5 translates the input source language to the target language as will be described hereinafter using the dictionaries, grammatical rules, and tree structure conversion rules stored in memory 6. The result of this translation is temporarily stored in main memory 2 and is displayed on CRT 3.

Figure 2:
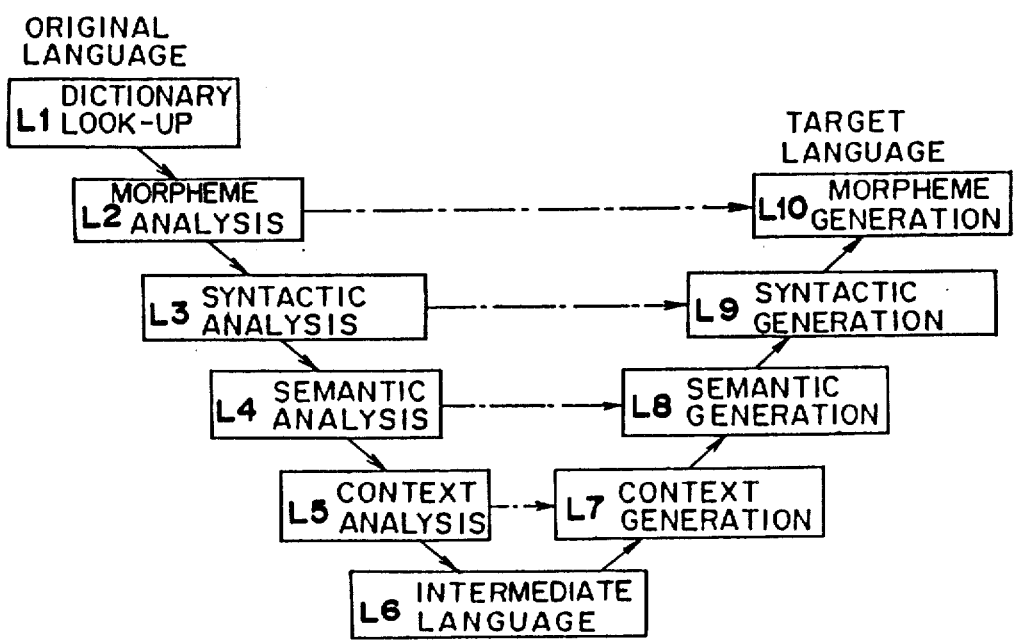
FIG. 2 is an explanatory diagram of the translation levels in automatic translation.

Automatic translation such as performed by translation module 5 generally consists of the analytical levels shown in FIG. 2. When the source language is input as shown at the top left of the figure, analysis progresses through level L1 dictionary referencing, level L2 morpheme analysis, level L3 grammatical construction, or syntactic, analysis, and son on.

Machine translation can be broadly divided into two major types according to these analytical levels. One is the pivot method in which sentences are analyzed through level L6 to obtain an intermediate language which is neither·the source language nor the target language. Analysis then proceeds through level L7 context generation, level L8 semantic generation, level L9 syntactic generation, and to level 10 morpheme generation, where the target language is generated.

The other is the transfer method in which the aforementioned level L2 morpheme analysis, level L3 grammatical construction analysis, level L4 semantic analysis, and level L5 context analysis are performed to obtain the internal syntax of the source language text. Next, the target language is generated after the internal syntax of the source language text is converted to the internal syntax of the target language text at the same level.

The aforementioned analysis is explained below.

* Dictionary referencing and morpheme analysis

The dictionaries of memory 6 in FIG. 1 are referenced to break the input sentence into discrete morpheme strings (word strings), to obtain part of speech and other grammatical information and word equivalents for individual morphemes, and to analyze tense, person, and number.

* Syntactical analysis

As will be described later, the structure (syntax analysis tree) of the sentence, including relationships between words, is determined.

* Semantic analysis

Semantically correct constructions are inferred and constructed from the results of multiple syntactical analyses.

* Context analysis

The topic of the sentence is inferred, and abbreviations and ambiguities are clarified.

Figure 3:
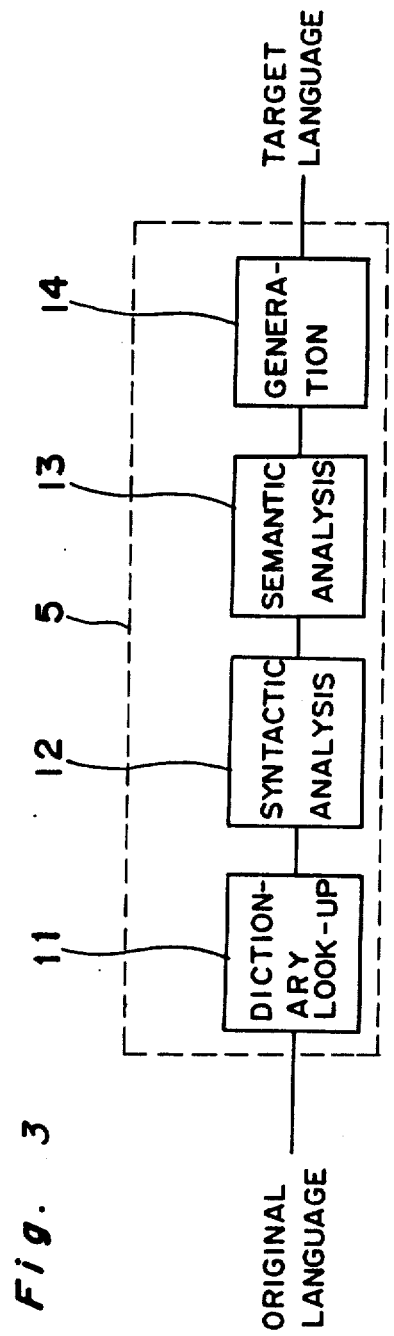
FIG. 3 is an operating structure diagram of the translation module according to the aforementioned preferred embodiment.

Translation module 5 used in the present invention shall, at the minimum, analyze the input sentence through level L3 syntactical analysis. Specifically, translation module 5 in the preferred embodiment shall be thought of as a translation module consisting of the parts as shown in FIG. 3.

Figure 4:
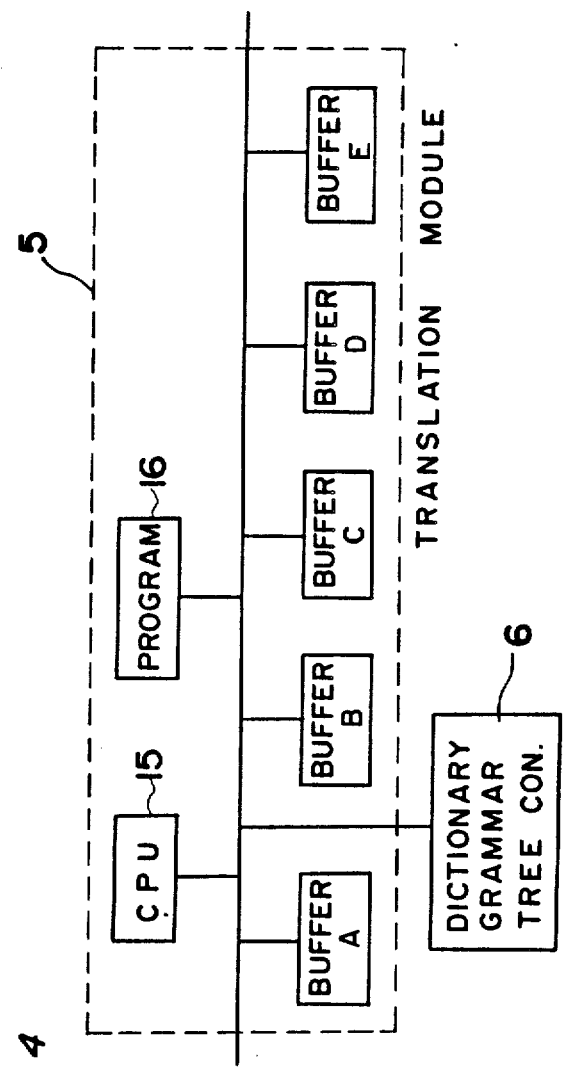
FIG. 4 is a block diagram of the aforementioned translation module.

Referring to FIG. 4, a block diagram of the aforementioned translation module 5 is shown. Furthermore, FIGS. 5 through 9 show the contents of buffers A through E shown in FIG. 4 during translation of the English sentence "This is a pen." to an equivalent Japanese sentence.

Operation during English-Japanese translation is described with reference to FIG. 3 through FIG. 9.

Figure 5:
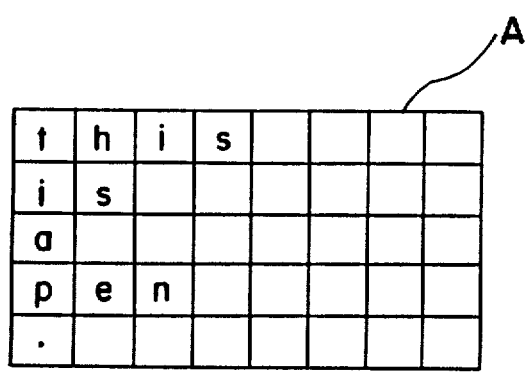
FIGS. 5–9 are diagrams showing the contents of each buffer shown in FIG. 4.
Figure 6:
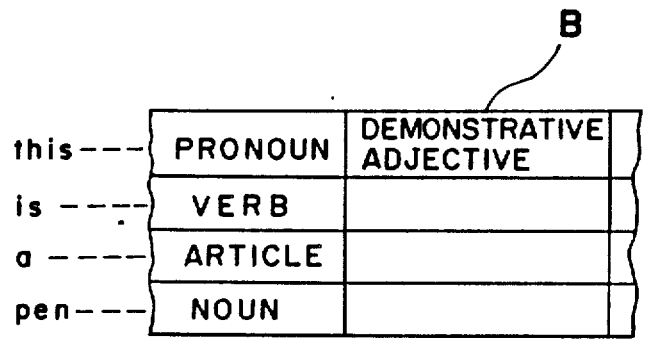
Figure 7:
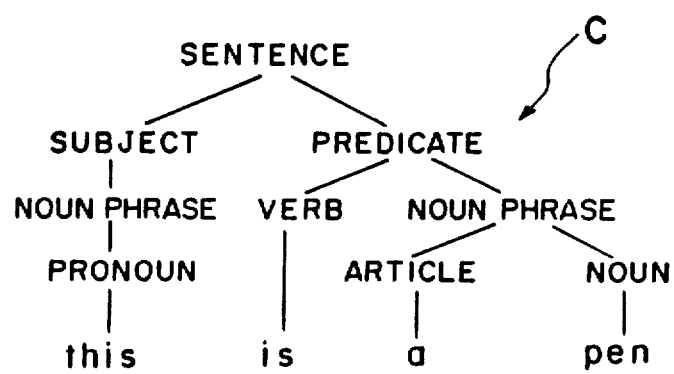

First, the original is stored in a manner shown in FIG. 5 in buffer A. As controlled by translation CPU 15 according to translation program 16, the information required for each word is obtained by dictionary-referencing morpheme analyzer 11 shown in FIG. 3 using the dictionaries in memory 6 according to the original text stored in buffer A, and this information is then stored in buffer B. For example, the part of speech information, which is a part of the aforementioned required information, is stored as shown in FIG. 6. In the example shown, "this" has multiple parts of speech, a single meaning is inferred by syntax analyzer 12 shown in FIG. 3. Syntax analyzer 12 determines the syntax analysis tree, shown in FIG. 7, which shows the relationship between individual words as defined by the dictionaries and grammatical rules in memory 6, and this syntax analysis tree is stored in buffer C. This syntax analysis tree is determined as follows, wherein specifically the grammatical rules in memory 6 state as shown in Table 1.

Table 1

Sentence→subject, predicate
Subject→noun phrase
Predicate→verb, noun phrase
Noun phrase→pronoun
Noun phrase→article, noun For example, the first rule states that "a sentence consists of a subject and predicate." In the following description, the syntax analysis tree is determined according to these rules.

Figures 8, 9:
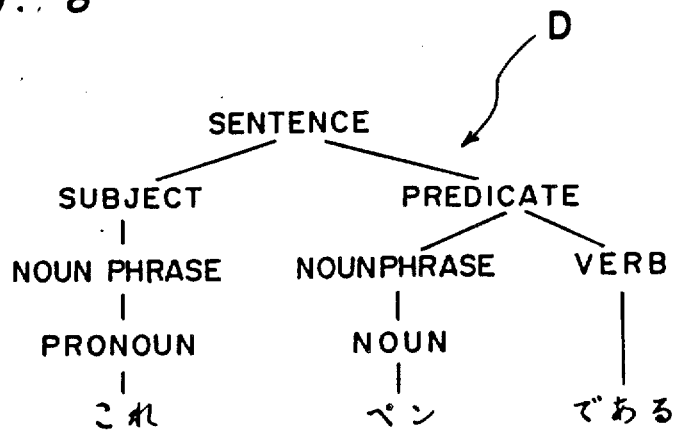

The convertor 13 shown in FIG. 3 converts the structure of the syntax analysis tree (see FIG. 7) for the source English sentence to the structure of the Japanese sentence as shown in FIG. 8 using the tree structure conversion rules in memory 6 in the same way the original tree was constructed by the aforementioned syntax analyzer. The result is then stored in buffer D of FIG. 4. Translated sentence generator 14 in FIG. 3 applies the postpositional article "WA" and auxiliary verbs appropriate to the obtained Japanese words "KORE PEN DE ARU," and outputs the result as shown in FIG. 9 to be stored in buffer E of FIG. 4. This Japanese sentence "KORE WA PEN DE ARU" is output from translation module 5, and stored in main memory 2 and displayed on CRT 3.

According to the first embodiment of the present invention, the source language text is separated into individual morphemes (words) by dictionary-referencing morpheme analyzer 11, and grammatical information such as parts of speech is obtained by referencing the dictionaries. If at this time an itemized sentence is read, numbers appearing at the beginning of the itemized sentence are so identified, and dictionary referencing process of dictionary-referencing morpheme analyzer 11 is described below with reference to the flow chart in FIG. 10.

At step S1 it is determined whether or not the read morpheme is the first morpheme in the sentence, and whether or not it is a number. If the read morpheme is identified as a first morpheme and yet as an ordinal number as the result of step S1, the process advances to step S2, and if not, to step S3. This first morpheme is identified as an ordinal number, if there is a period following the numeric, such as with "1.", or if the numeric is enclosed in parentheses, such as with (1).

At step S2, information identifying the first morpheme identified to be a number as a "sentence beginning with adverb" is stored in the address to buffer B in FIG. 4.

At step S3, it is determined whether the next morpheme read is the second morpheme in the string and whether or not the first morpheme was an ordinal number. If the result is that the next morpheme is the second morpheme and that the first morpheme was a number, the processes advances to step S4; if not, to step S5.

At step S4, the second morpheme is treated as the first word in the sentence, and dictionary referencing is so executed. Specifically, if the first letter of the word is majuscule, dictionary referencing occurs after the majuscule is converted to a minuscule. The obtained part of speech information is then stored in buffer B of FIG. 4.

At step S5, standard dictionary referencing is performed, and the obtained part of speech information is stored in the aforementioned buffer B.

At step S6, it is determined whether dictionary referencing has been completed for all morphemes. If this result shows that dictionary referencing has not been performed for all morphemes, the process returns to step S1; if not, the dictionary referencing process terminates.

By executing the process hereinbefore described, conventional translation processing, including syntactical analysis, conversion processing, and generation processing, may proceed and numbers at the beginning of the input source text will also be output at the beginning of the translated text.

Figures 10, 11:
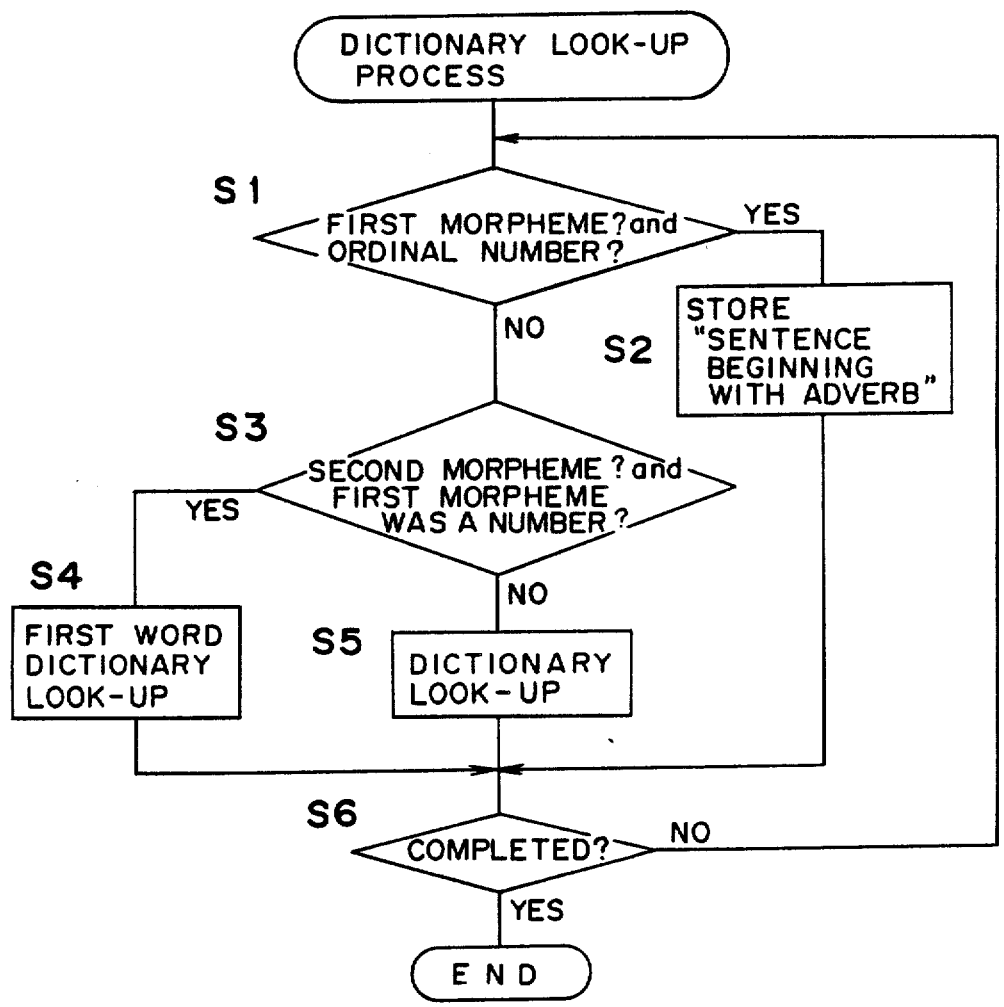
FIG. 10 is a dictionary referencing flow chart.
FIG. 11 is a diagram showing a sample text input to the machine translation apparatus in FIG. 1 and the corresponding output sentence (translated sentence)

FIG. 11 is an example of the English text input to a machine translation apparatus according to a preferred embodiment of the present invention and the Japanese text output from this machine translation apparatus. It is to be noted that the number "2." at the beginning of the input text is output also at the beginning of the output text.

As thus demonstrated, in the first embodiment according to the present invention, if itemized sentences which begin with a number are in the source English text when translating an English text into Japanese, a number at the beginning of the source text is also output as a number at the beginning of the output text and itemized sentences can be correctly and quickly translated because data identifying numbers at the beginning of the source text as "sentence beginning with adverbs" are stored in buffer B, and because the second morpheme in the source text is treated as the first word in the sentence and dictionary referencing is accordingly executed.

As will become clear from the description of the first embodiment hereinbefore provided, because the present invention provides a machine translation apparatus provided with a morpheme analyzer, syntax analyzer, convertor, and translated sentence generator with a number discrimination means and a memory control means, and stores by means of the aforementioned memory control means information identifying numbers appearing at the beginning of a source text as sentence beginning adverbs when the aforementioned number discrimination means identified the first morpheme as a number, correct, quick translation in which prior deletion of numeric parts is not required is possible when translating an itemized sentence which begins with a number.

Next, the second embodiment of the present invention will be described in which the distinction between a heading and a sentence can be made during the translation procedure, particularly in the operation of dictionary-referencing morpheme analyzer 11 in the aforementioned translation module 5.

According to the second embodiment, it is assumed that only the grammatical rules shown in Table 2 are stored in the aforementioned memory 6.

Table 2

(a) noun phrase→noun+noun
(b) noun phrase→noun+noun+noun
(c) predicate→verb
(d) declarative sentence→noun phrase+predicate
(e) sentence declarative sentence+end punctuation mark
(f) sentence noun phrase+end punctuation mark The grammatical rules in the aforementioned Table 2 express the following.

Specifically, grammatical rule (a) says that a noun phrase is composed of a noun and a noun; rule (b) that a noun phrase is composed of a noun and a noun and a noun; rule (c) that a predicate is composed of a verb; rule (d) that a declarative sentence is composed of a noun phrase and a predicate; rule (e) that a sentence is composed of a declarative sentence and an end punctuation mark; and rule (f) that a sentence is composed of a noun phrase and an end punctuation mark.

Figure 12:
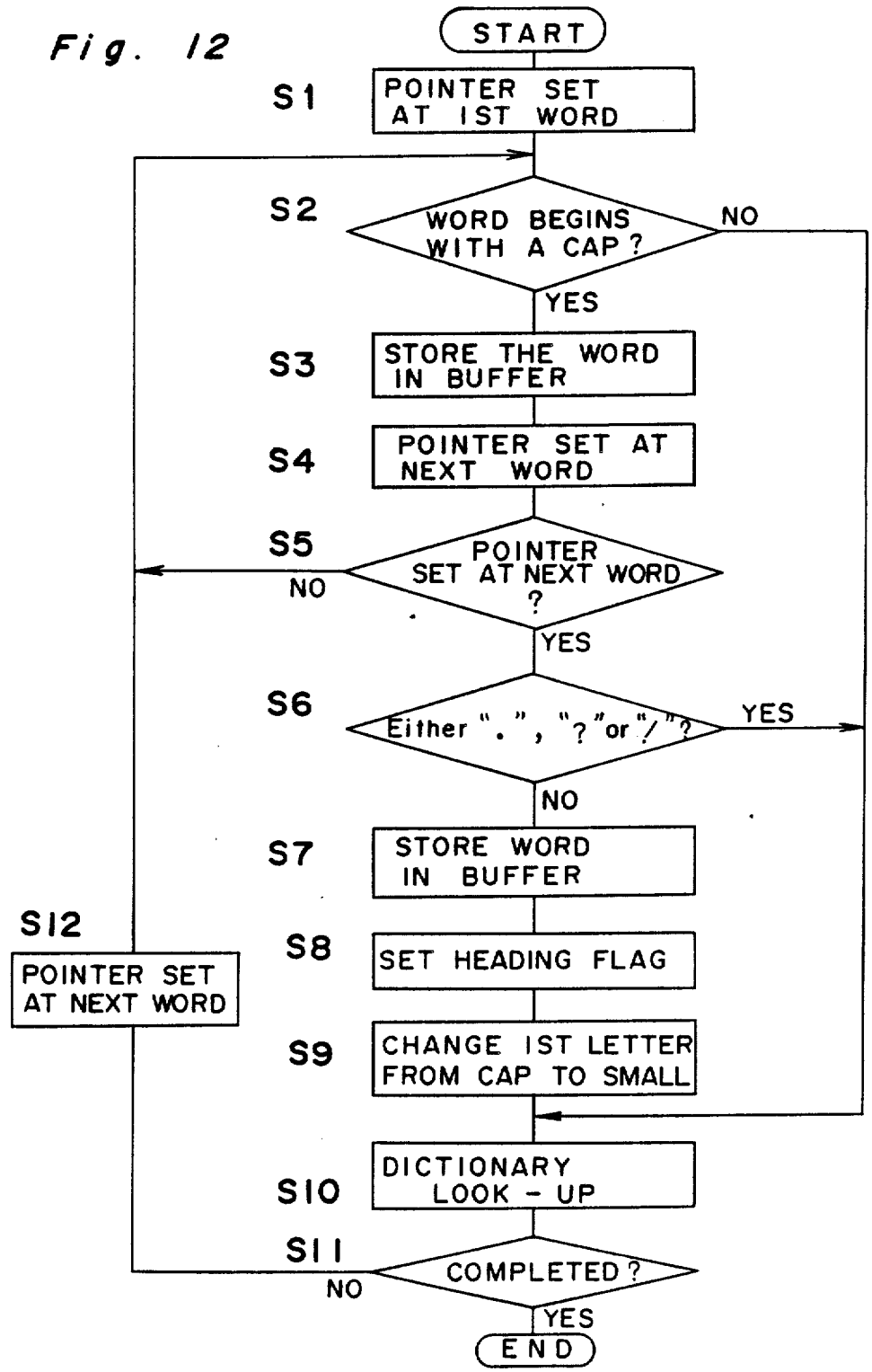
FIG. 12 is a flow chart showing an operation of heading distinction processing according to the second embodiment of the present invention.

Referring to FIG. 12 a flow chart of heading distinction processing according to the second embodiment of the present invention is shown.

At step S1, the pointer is set at the first word.

At step S2, it is determined whether or not the beginning of the word at which the pointer was set in step S1 is a majuscule. If the result is that the beginning is a majuscule, the process advances to step S3; if not, the process advances to step 10.

At step S3, the word which begins with a majuscule is stored in the buffer.

At step S4, the pointer is set to the next word.

At step S5, it is determined whether the word at which the pointer is set is the last word in the word string or not. This detection is done by the detection of a carry return provided next to the last word. Based on this result, if it is a last word, the process advances to step S6; if not, it returns to step S2.

At step S6, it is determined whether or not the last word as detected at step S5 is either a period, a question mark or an exclamation mark (these marks are also treated as a word). If this result shows the last word to be either a period, a question mark or an exclamation mark, the process advances to step S10; if not, to step S7.

At step S7, the last word determined in steps S5 and S6 not to be a period, a question mark or an exclamation mark is stored in the buffer.

At step S8, the morpheme stored in the aforementioned buffer is specified to be a heading, and the heading flag is set.

At step S9, the majuscule at the beginning of each word stored in the aforementioned buffer is converted to a minuscule.

At step S10, dictionary referencing for each word beginning with a minuscule occurs, and part of speech and other information is obtained.

At step S11, it is determined whether processing has completed; based on this result, if it has completed, the heading distinction operation ends, if it has not, the process advances to step S12.

At step S12, the pointer is set to the next word.

The heading translation operation based on the heretofore described heading distinction processing operation is hereinbelow described in greater detail using a specific input phrase.

In this description, it will be assumed that the following word strings are input:
(a) "Surface Temperatures Rise"
(b) "Surface temperatures rise."

When word string (a) is input, each word, "Surface," "Temperatures," and "Rise," is stored in the buffer at steps S2, S3, S4, and S5 in the flow chart of FIG. 12 because the beginning of each word is a majuscule.

Next, because a space follows after "Rise," the word string (a) previously stored in the buffer are confirm to be headings at steps S5 and S6. Next, the heading flag is set at step S8, and at step S9 the majuscules S, T, and R at the beginning of each word stored in the aforementioned buffer are converted to minuscules. After that, at step S10, dictionary referencing is executed for each word for which the beginning was converted to a minuscule. The part of speech information obtained as the result is stored in the dictionary referencing result buffer in translation module 5 as shown in FIG. 13. To make the processing of dictionary-referencing morpheme analyzer 11 easier, end punctuation which does not exist in input phrase (a) is added to the buffer.

Figure 14A:
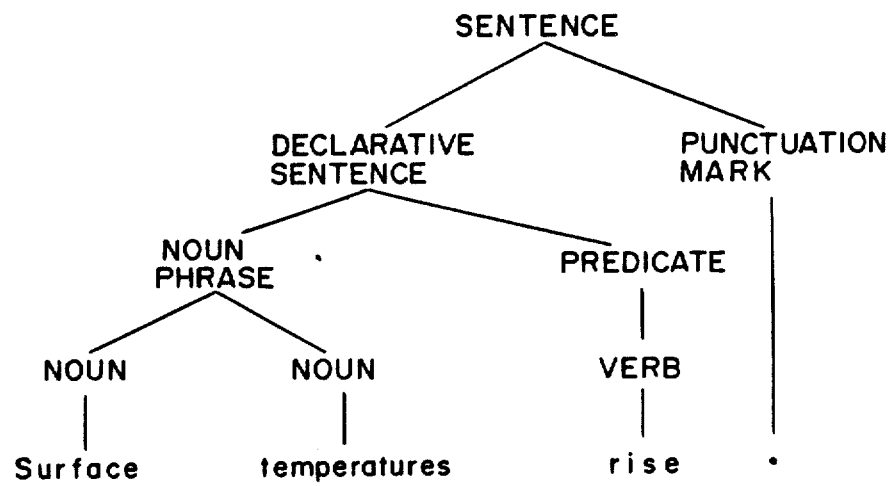
FIGS. 14a and 14b show tree structures for the syntax analysis tree.

Next, syntax analyzer 12 analyzes as shown in FIG. 14a the grammatical structure of the contents of the dictionary referencing result buffer shown in FIG. 13 using grammatical rules (a), (d), (c), and (e) shown in Table 1 in said order. In addition, syntax analyzer 12 checks the heading flag set at step S8 in FIG. 12 in a shown by a flow chart of FIG. 15.

Figure 15:
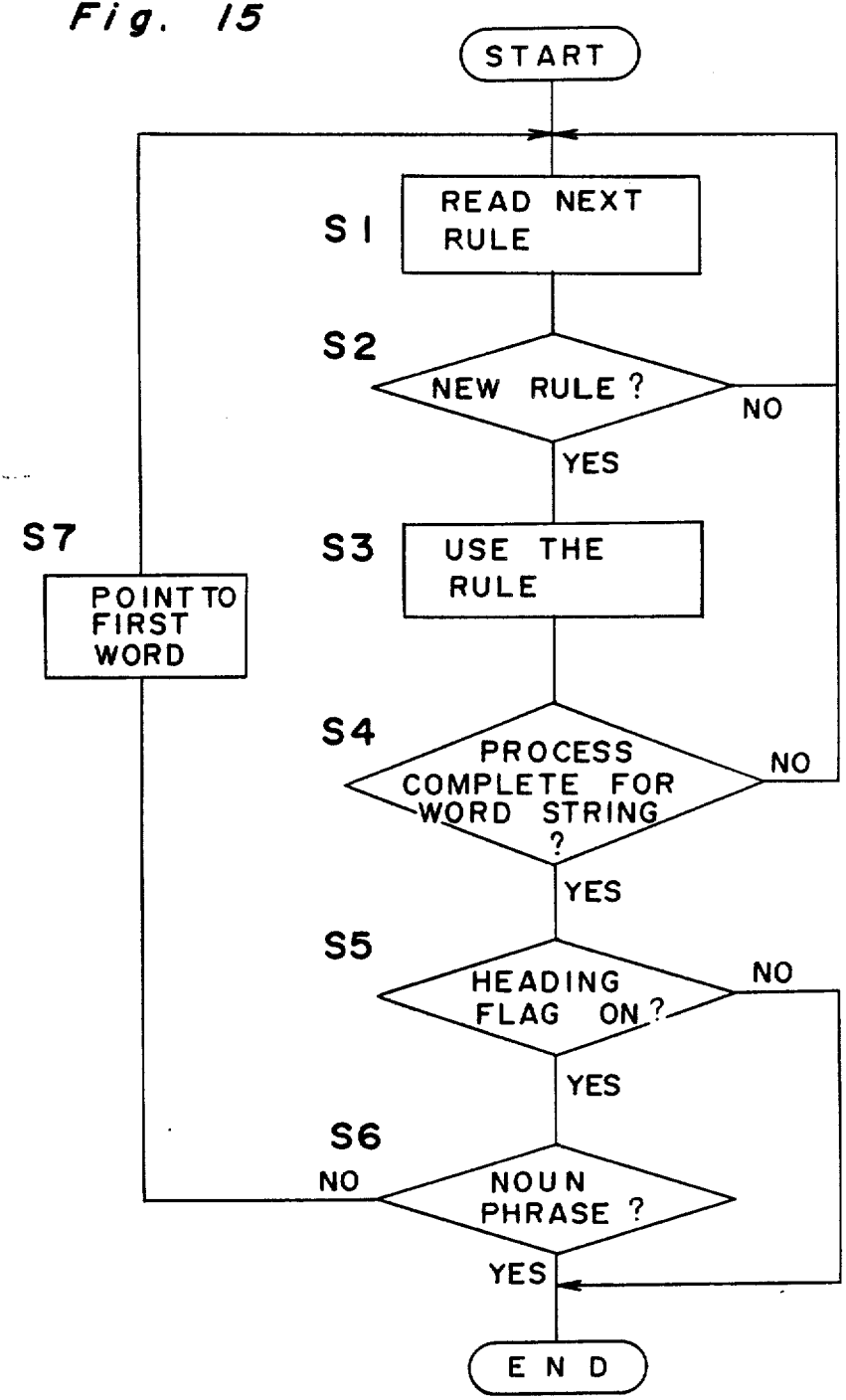
FIG. 15 is a flow chart showing operation for detecting the heading flag.

Referring to FIG. 15, at step S1, a grammatical rule from Table 2 is read, and at step S2, it is detected whether or not the obtained grammatical rule is a newly obtained rule. If no, the procedure returns back to step S1, and if yes, it goes to step S3 at which the obtained grammatical rule is effected. Then, at step S4, it is detected whether or not all the words have been processed. If no, the procedure returns back to step S1, and if yes, it goes to step S5 at which it is detected whether or not the heading flag is on. If the heading flag is not on, the translation is deemed as completed, and if it is on, the procedure goes to step S6 at which it is detected whether or not the translated result is a noun phrase. If the translated result is not a noun phrase, the pointer is reset to the first word at step S7 and the procedure returns back to step S1. If the translated result is a noun phrase, then the translation is deemed as completed.

In the above flow chart, the grammatical rule as read in step S1 is selected in the following manner. As shown in FIG. 14a, since the first word is a noun, a grammatical rule that begins with a noun in the right side thereof is selected. Grammatical rules (a) and (b) are applicable to this requirement. It is assumed that rule (a) is selected. Since rule (a) requests another noun to be added, it is examined in the buffer shown in FIG. 13 that the following word is a noun or not. Since the following word is a noun, the first rule is satisfied to obtain a fact that the first two words define a noun phrase.

Then, next grammatical rule that begins with a noun phrase in the right side thereof is selected. A grammatical rule (d) is applicable to this requirement, and thus rule (d) is selected. Since rule (d) requests a predicate added thereto, it is examined in the buffer shown in FIG. 13 that the following word is a predicate or not. Since it is not a predicate, this rule (d) is temporarily stored in the buffer without being completed.

Then, since the next word is a verb, a grammatical rule that begins with a verb in the right side thereof is selected. A grammatical rule (c) is applicable to this requirement, and thus rule (c) is selected. By rule (c), a predicate is obtained.

Then, it is searched in the buffer whether or not there is a request for a predicate. Since the rule (d) is requesting a predicate, the newly obtained predicate is applied to the stored rule (d) which is now satisfied to produce a declarative sentence.

Then, next grammatical rule that begins with a declarative sentence in the right side thereof is selected. A grammatical rule (e) is applicable to this requirement, and thus rule (e) is selected. Since rule (e) requests a punctuation mark, it is examined in the buffer shown in FIG. 13 that the following word is a punctuation mark or not. Since the following is a punctuation mark, rule (e) is satisfied to obtain a fact that a sentence is completed.

The above procedure is carried out by repeating the steps S1-S4 shown in FIG. 15.

Figure 14B:
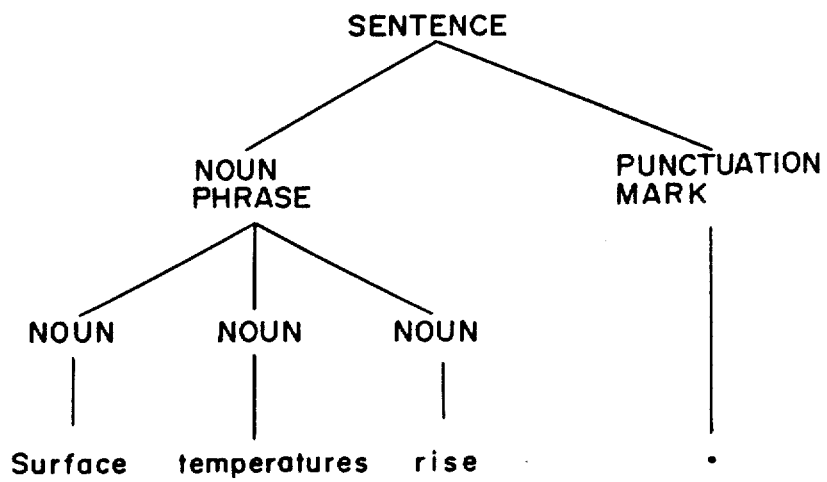

After the above procedure, in the case where the heading flag is set, input phrase (a) is determined to be a heading. In this case, syntax analyzer 12 disapproves the analysis of the grammatical structure using the predicate as shown in FIG. 14a. As the result, a back-track functions in syntax analyzer 12, so that the part of speech for "rise" stored in the dictionary referencing result buffer shown in FIG. 4 is changed to the second defined part of speech, i.e., a noun, and the pointer point the first word to restart the analysis of the grammatical structure. This time, the grammatical rules (b) to (f) in Table 1 are used in said order in a similar manner described above, thereby obtaining a syntactical analysis as shown in FIG. 14b. Thus, because the completed construction is a noun phrase, syntax analysis succeeds, and the syntax analysis tree of the source language in FIG. 14b is determined. Processing is thereafter passed to convertor 13 and translated sentence generator 14, the translation result of input phrase (a) is output as shown in FIG. 16, line (a), and heading translation processing terminates.

When input phrase (b) is input, because the beginning of the word "Surface" is a majuscule, the word "Surface" is stored in the buffer according to steps S2 and S3 in the flow chart of FIG. 12. Since the beginning of the next word "temperatures" is a minuscule, the word "temperatures" is not determined to be in a heading at step S2, step S8 is skipped, and the heading flag is therefore not set. At step S10, dictionary referencing occurs for this word and the word stored in the buffer, "Surface." Dictionary referencing also occurs for the next word "rise" at steps S2 and S10. As a result, the syntax analysis tree as shown in FIG. 14a is determined by syntax analyzer 12. Furthermore, conversion processing and translated sentence generation processing are executed based on this syntax analysis tree. The translation result is output as shown in FIG. 16, line (b), and translation processing terminates.

As described heretofore, using the fact that headings are in general noun phrases and that each word in word strings composing a heading normally begins with a majuscule, it can be determined whether the input original is a heading or a sentence by distinguishing whether the beginning of an input word is a majuscule and whether the last word is a period, a question mark or an exclamation mark. Therefore, because the majuscule at the beginning of each word is converted to a minuscule if the phrase is thus determined to be a heading as heretofore described, a translation appropriate to the heading is enabled and it is regularly possible to make a correct translation even if a heading is input without misinterpreting headings for common sentences, and without misanalyzing words in the heading.

As will become clear from the description of the second embodiment hereinbefore provided, because the present invention provides a machine translation apparatus provided with a morpheme analyzer, syntax analyzer, convertor, and translated sentence generator with a majuscule discrimination means, a storage means, a heading specifying means, and a majuscule/minuscule conversion means, stores morphemes determined by the aforementioned majuscule discrimination means to begin with a majuscule in a storage means, and enables translation appropriate to a heading by specifying the morpheme stored in the aforementioned storage means to be a heading by the aforementioned heading specifying means, accurate structural analysis can occur even if text with mixed headings and common sentences is input, and high precision translation can occur.

Furthermore, when translating a heading, because the beginning majuscules of the morphemes stored in the storage means are converted to minuscules by the aforementioned majuscule/minuscule conversion means, words in the word string which begin with a majuscule can be matched with registered words in the dictionary, enabling high precision translation without words in the heading being identified with the wrong part of speech or being handled as proper nouns.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A machine translation apparatus comprising:
   a morpheme analyzer having a dictionary for analyzing a source sentence into morphemes and for obtaining part of speech and other information using said dictionary;
   a syntax analyzer having grammatical rules for analyzing the structure of the morphemes identified by said morpheme analyzer using said dictionary and grammatical rules;
   a convertor for converting the structure obtained by said syntax analyzer to a structure of the target language;
   a translated sentence generator for generating a translated sentence according to the structure of the target language obtained by said convertor;
   a number discrimination means which distinguishes whether or not the first morpheme to appear in the sentence separated by said morpheme analyzer is a number; and
   a memory control means which, when said number discrimination means identifies the morpheme at the beginning to be a number, stores data which identifies said number as a sentence beginning adverb so that said number is added to the beginning of said translated sentence converted to the target language.

2. A machine translation apparatus as claimed in claim 1, further comprising:
   a majuscule discrimination means which distinguishes whether or not the first letter of the input morpheme is a majuscule;
   a storage means which stores words for which the first letter was distinguished to be a majuscule by said majuscule discrimination means; and
   a heading specifying means which specifies the words stored in said storage means to be a heading if a word continuing after the word stored in said storage means is a last word and is other than a period, a question mark and an exclamation mark.

3. A machine translation apparatus comprising:
   a morpheme analyzer having a dictionary for analyzing a source sentence into morphemes and for obtaining part of speech and other information using said dictionary;
   a syntax analyzer having grammatical rules for analyzing the structure of the morphemes identified by said morpheme analyzer using said dictionary and grammatical rules;
   a convertor for converting the structure obtained by said syntax analyzer to a structure of the target language;
   a translated sentence generator for generating a translated sentence according to the structure of the target language obtained by said convertor;
   a majuscule discrimination means which distinguishes whether or not the first letter of the input morpheme is a majuscule;
   a storage means which stores words for which the first letter was distinguished to be a majuscule by said majuscule discrimination means; and
   a heading specifying means which specifies the words stored in said storage means to be a heading if a word continuing after the word stored in said storage means is a last word and is other than a period, a question mark and an exclamation mark.

4. A machine translation apparatus as claimed in claim 3, further comprising a majuscule/minuscule conversion means which converts the majuscule of the first letter of the word stored in said storage means to a minuscule if said heading specifying means specifies that the words stored in said storage means is a heading.

* * * * *